Sept. 8, 1942.　　　　　J. MADISON　　　　　2,295,416
PLUMBING CONSTRUCTION
Filed Dec. 10, 1940
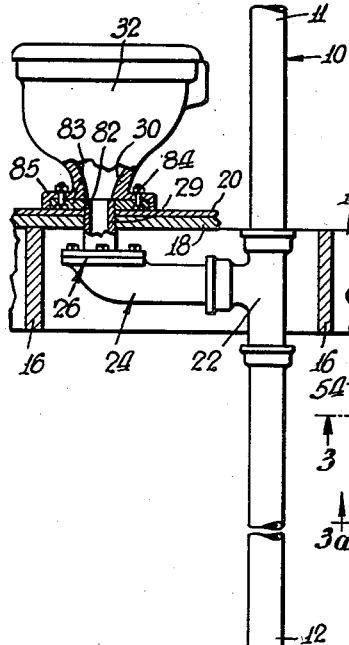
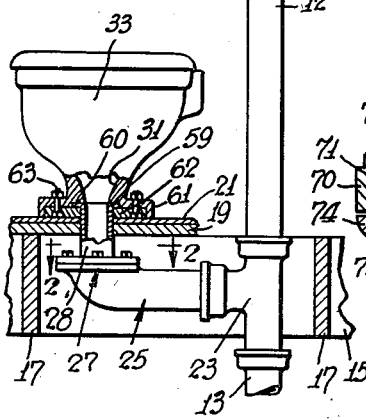
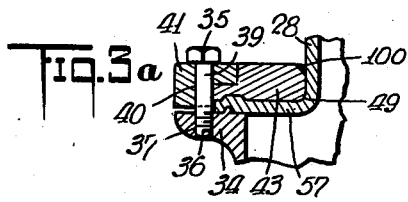
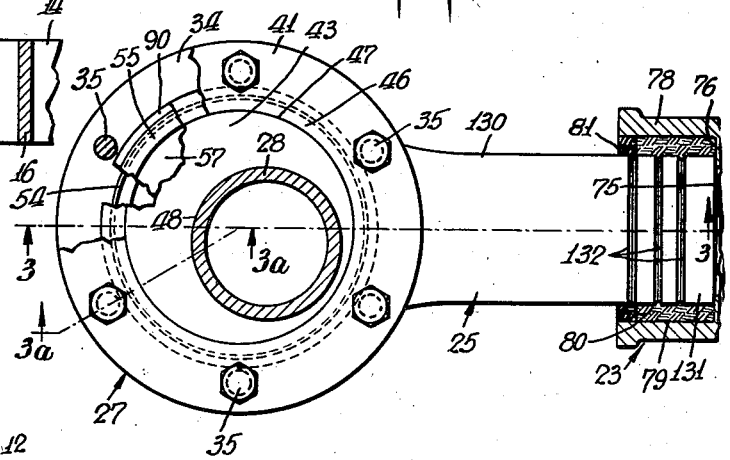
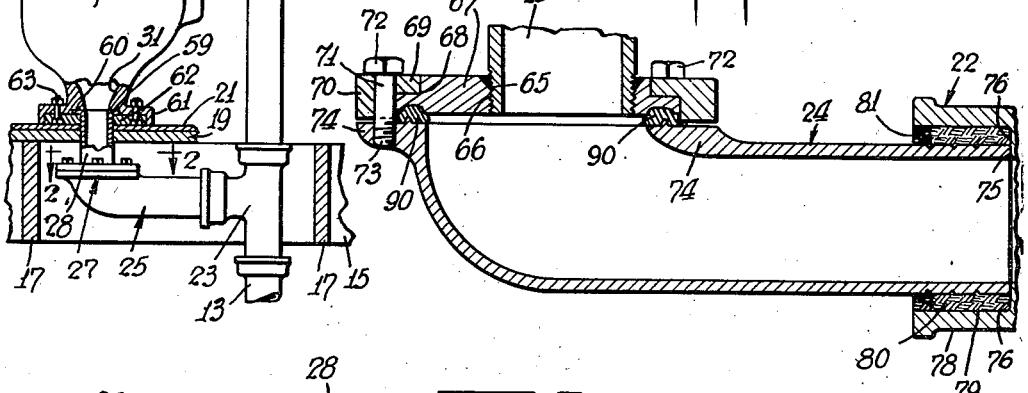
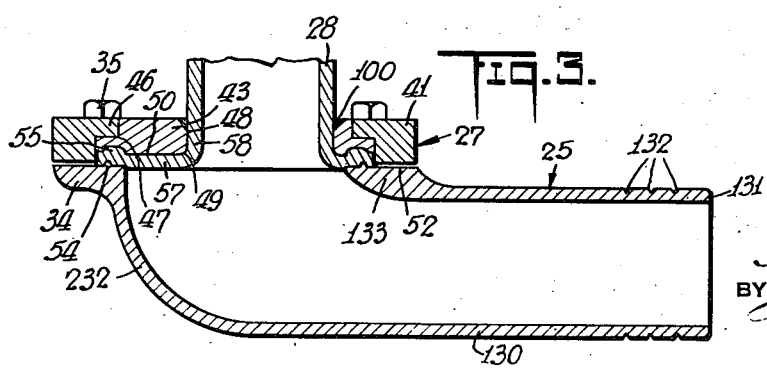
INVENTOR
Jacob Madison
BY
ATTORNEY Patented Sept. 8, 1942

2,295,416

UNITED STATES PATENT OFFICE 2,295,416

PLUMBING CONSTRUCTION

Jacob Madison, Clifton, N. J.

Application December 10, 1940, Serial No. 369,377

3 Claims. (Cl. 4—252)

The present invention relates to plumbing constructions and it particularly relates to improved constructions which will enable ready installation, assembly and aligning of the plumbing connections.

The present invention will be particularly illustratively described in connection with connections for water-closets to soil pipes or other drainage pipes, but it is to be understood that it also has a broad application to coupling connections between pipes, conduits, drains and other devices where the parts are not in such alignment as to permit the use of standard coupling connections, whether these be liquid conduits or gas conduits which are to be connected together to form a branched conduit drainage or feed system.

With particular reference to the connections of water-closets on several floors or upon a single floor of a building, it is often found that the various outlet connections of the closets are not in true alignment or even if they are initially in alignment, settlement or shrinkage of the floors or walls of the building during or after construction, will often cause a misalignment or derangement of the system which cannot be readily corrected.

It is, therefore, among the objects of the present invention to provide improved conduit connections particularly useful in plumbing systems where drains or soil pipes are to be connected, as for example to a water-closet arrangement and where perfect alignment is not possible, which conduit connections will enable ready connection of the various drains or water-closets to the main conduit connections without exact alignment and without the need of using and bending lead pipes or elbows and without the necessity of including expensive bellows or other flexible or bendable elbows or conduit connections.

Another object is to provide an improved conduit arrangement for coupling pipes together, which may be broadly utilized in connection with soil pipes and drain pipes, which will permit liquid or gas-tight connection between conduits even though they are out of alignment or may become out of alignment after assembly.

Still further objects and advantages will appear from the more detailed description set forth below, it being understood, however, that this more detailed description is given by way of illustration, since various changes therein may be made by those skilled in the art without departing from the scope and spirit of the invention.

In accomplishing the above objects, it has been found most satisfactory according to the present invention to provide an elbow connection in which at the bend of the elbow there is provided a ferrule or ring having an opening eccentrically disposed in respect to the center line of the conduit connection. This ring, which will carry the eccentric connection of the elbow or the stand-pipe, is in turn clamped or held down by an outer flange, a collar or outside ring which is recessed so as to grasp the inside ring or eccentric ferrule and also provide sufficient space for a gasket or other sealing means.

In one form of construction, the stand-pipe or eccentric connection which is fitted into the opening in the interior ring or ferrule consists of a flexible lead conduit or pipe member which has an out- and under-turned flange extending under said ferrule and terminating short of the bolts which hold the outer ring or outer flange in position. The exterior periphery of the out-turned edge of the lead stand-pipe will serve as a gasket or sealing means.

Where a cast iron stand-pipe or eccentric conduit connection is employed, the eccentric opening in the ferrule may be tapped with a pipe thread to receive the lower threaded end of the stand-pipe, whereby a liquid or gas-tight connection will be formed between the ferrule and the stand-pipe. Another gasket may be positioned between the elbow and the ferrule terminating short of the bolts which clamp the outer flange or ring down against the elbow holding the ferrule and gasket in position.

In the drawing, which illustrates one of the preferred embodiments of the present invention, but to which the invention is by no means restricted, since many changes and alterations might be made, all within the scope of the invention of the present specification, Fig. 1 is a diagrammatic side elevational view illustrating the application of the connections of the present application to several floor levels, these connections being shown illustratively as applied to water-closets, Fig. 2 is a plan view upon an enlarged scale taken on the line 2—2 of Fig. 1, partly broken away to more clearly show the construction, Fig. 3 is a side sectional view taken on the line 3—3 of Fig. 2 of the form of coupling connection shown at the lower portion of Fig. 1, Fig. 3a is a detailed fragmentary transverse sectional view upon the line 3a—3a of Fig. 2, and Fig. 4 is a side sectional view of a modified form of coupling shown at the upper end of Fig. 1.

Referring to Fig. 1, the stack or soil pipe 10 is provided with the sections 11, 12 and 13, extending between the floors 14 and 15 of an apartment house or building construction. These floors are provided with crossbeams 16 and 17 which carry the ceiling (not shown), and also the flooring 18 and 19, together with the floor covering 20 and 21.

The sections 11, 12 and 13 of the soil pipe or stack are connected by the T's 22 and 23 to each other and to the bend or elbows 24 and 25 which are provided with the adjustable connections at 26 and 27 to which this invention is particularly directed.

The upright or vertical stand-pipes 28 and 29 extend through the floor to the drain connection 30 and 31 of the water-closets 32 and 33.

Referring to the construction at 27 at the lower part of the arrangement there is provided a bend or elbow 25 having the horizontal cylindrical portion 130, the end 131 of which is provided with a series of grooves 132, three being shown.

At any one of these grooves 132 the end of the pipe may be broken so as to shorten the section 130. The horizontal cylindrical section 130 turns upwardly as indicated at 232, and is provided with a thickened portion 33, which has the flange 34 for receiving the bolts 35, the lower threaded ends 36 of which are received in the tapped openings 37 in the flange 34 (see Fig. 3a).

The upper shanks 39 of the bolts 35 pass through the bores or openings 40 in the outside ring or flange 41.

It will be noted that the outer ring or flange 41 is recessed at 44, which recess forms the overhanging ledge portion 46, while the inside ring or ferrule 43 is recessed at 47 to form a pocket for receiving the overhanging ledge 46 of the outside flange or ring 41.

The stand-pipe 28 is connected to the inside face 48 of the eccentric opening in the eccentric ferrule 43, and then it passes over the rounded corner 49 and over the lower face 50 of said ferrule 43. It finally extends up to a point just short of the bolts 35. This is better shown in Fig. 4.

The upper face 52 of the thickened portion 33 and the lower face 50 of the eccentric ferrule 43 are respectively provided with an opposite ridge 54 and groove 55, which clamp or grip the outwardly flanged portion 57 of the upright lead pipe 29 and form a liquid-tight connection.

The outwardly flanged portion 57, as well as the portion 58 of the lead pipe 29 may be soldered or brazed to the inside face 48, as well as the under face 50 of the eccentric ferrule 43. The recess 100 in the inner upper face of the ferrule 43 may be filled with a sealing compound. It will be noted that the outer edge of the flange 57 terminates short of the shank 39 of the bolt 35, as is best shown in Figs. 3 and 3a, so that upon loosening of the bolts 35, the stand-pipe 28, together with the ferrule 43, may be rotated relatively to the elbow 25 and the outer ring 41.

The upper end of the lead stand-pipe 28 may have an out-turned flange portion 59 extending into the recess 60 of the flange 61 of the water-closet 33.

This flange 59 is pressed down upon the ring 62 by the bolt 63 which extends down through the flange 61 and the ring 62. The connection of the end 31 of the elbow 25 to the T connections 23 is more fully shown in connection with Figs. 2 and 4.

Referring to the construction of Fig. 4, which is shown in the upper part of Fig. 1, the standpipe 29 may be of cast metal and provided by the pipe thread at 65 which is screwed into the pipe thread 66 on the eccentric opening of the eccentric flange ferrule 67.

This ferrule 67 otherwise may be of the same construction as the ferrule 43 of Fig. 3.

The ferrule 67 has a recessed portion 68 receiving the over-hanging portion 69 of the outer flange or ring 70. Both the ferrule 67 and the ring 70 receive the shank 71 of the bolts 72. The lower threaded ends 73 are screwed into the thickened or flange portion 74 of the elbow or bend 24.

The ends 75 of the elbows 24, as shown at the right of Fig. 4, contact the shoulders 76 of the enlarged head 78 of the T fitting 22. The space 79 left between the enlarged receiver 78 and the end portion 75 of elbow 24, is filled with oakum at 80 which is stamped or forced in and then sealed by the molten lead or other plastic sealing material 81, forming a liquid and gas-tight connection.

The upper portion of the stand-pipe 29, as indicated in the top of Fig. 1, is threaded at 82 into the ring 83, which carries the bolt 84 for fastening down the flange 85 of the closet 32.

In operation, with the bolts 35 and 72 in loosened condition and with the upright pipes 28 and 29 attached to the ferrules 43 and 67, it is possible to turn the pipes 28 and 29 so as to adjust their position to correct firm alignment between the closets 32 and 33 and thus vary the spacing between the axes of the stand-pipes 28 and 29 and the main soil stack 10.

When this adjustment has been made, the bolts 35 and 72 may be tightened, clamping the flange 57 of the stand-pipe 28 or the gasket 90 between the eccentric ferrules 43 and 67 and the flanges or thickened portions 33 and 74 of the elbows 24 and 25, and thus making the connection liquid and gas-tight.

It is apparent that this connection may be readily adjusted and alignment corrected for not only during initial setting up or construction of the dwelling or plumbing fixtures on the different floors of the apartment house or other structure, but it is also possible after the structure has settled or there has been shrinkage to correct after the adjustment so that the closets 32 and 33 will not be moved away from or elevated from the floor with changes in spaces as frequently occur during the service of a building.

Although the device as shown may be made of various materials and the pipes, conduits, ferrules and rings may be made of brass, iron, copper or zinc, it has been most satisfactory according to one embodiment of the present invention, to form the ferrules 43 and 67 of brass, the stand-pipe 28 of lead, and the outer flanges 41 and 70, the bends 24 and 25, the T's 22 and 23, the soil stack sections 11, 12 and 13, and the stand-pipe 29 all of cast iron.

According to one embodiment of the invention, to which the invention is by no means restricted, with stand-pipe of 3″ diameter and with an outlet of 3″ in the elbows 24 and 25, the outer rings 41 and 70 may have thickness of about $1\frac{5}{32}$ inches and a maximum width of about 1½″, with an over-all outside diameter of about 8¼″.

The inside ferrules or rings may have an eccenric opening of about 3¼″ and the center line of the bolts may be on a circle of 7 inches. By this construction, it is possible to eliminate lead elbows which would have to be used in lieu of the cast iron elbows 24 and 25 of the present application. And it is also possible to eliminate the wiped solder joints and the difficulty of adjusting the alignment and the lead bends to changes in alignment. The rings or flanges 62 and 83 may also be of brass material.

Not only is the present invention applicable to plumbing connections, but it is also broadly applicable to various places where drains have to be utilized in connection with conduit systems.

As many changes could be made in the features and details, and many apparently widely different embodiments of this invention could be made without departing from the scope thereof, and it is intended that all matter contained in the above description shall be interpreted as illustrative and not in a limiting sense.

What is claimed is:

1. Adjustable eccentric connections between the lower end of a stand-pipe to be connected to a water closet and the upper end of a vertical portion of a right angle elbow connected to a vertical soil pipe, said connection including an outwardly extending flange at the upper end of the vertical portion of the elbow, an outwardly extending flange at the lower end of said stand-pipe resting on, but terminating inside of said first-mentioned flange, said second-mentioned flange being eccentric and shouldered at its upper outer periphery and an interiorly shouldered ring of the same exterior dimension as said first flange to engage the shoulder of said second flange, said ring being bolted to said first flange and said second flange being rotatable within said ring, said second flange consisting of an out-turned portion integral with the stand-pipe and of a superimposed ferrule rigidly joined to the lower end of said stand-pipe.

2. For use in a plumbing construction having a vertical soil pipe draining a plurality of superimposed water closets, said soil pipe having sections extending between the floors of a multi-floor building, which floors support said closets, the sections being connected by T's having horizontal stems, right angle elbows having horizontal portions connected to said stems and vertical portions connected to the closets, said closets each having a depending stand-pipe emptying into said vertical portions; adjustable eccentric connections between the lower ends of said stand-pipes and the upper ends of said vertical portions, each connection including an outwardly extending flange at the upper end of the vertical portion of the elbow, an outwardly extending flange at the lower end of said stand-pipe resting on, but terminating inside of said first-mentioned flange, said second-mentioned flange being eccentric and shouldered at its upper outer periphery and an interiorly shouldered ring of the same exterior dimension as said first flange to engage the shoulder of said second flange, said ring being bolted to said first flange and said second flange being rotatable within said ring, said second flange consisting of an out-turned portion integral with the stand-pipe and of a superimposed ferrule rigidly joined to the lower end of said stand-pipe.

3. For use in a plumbing construction having a vertical soil pipe draining a plurality of superimposed water closets, said soil pipe having sections extending between the floors of a multi-floor building, which floors support said closets, the sections being connected by T's having horizontal stems, right angle elbows having horizontal portions connected to said stems and vertical portions connected to the closets, said closets each having a depending stand-pipe emptying into said vertical portions; adjustable eccentric connections between the lower ends of said stand-pipes and the upper ends of said vertical portions, each connection including an outwardly extending flange at the upper end of the vertical portion of the elbow, an outwardly extending flange at the lower end of said stand-pipe resting on, but terminating inside of said first-mentioned flange, said second-mentioned flange being eccentric and shouldered at its upper outer periphery and an interiorly shouldered ring of the same exterior dimension as said first flange to engage the shoulder of said second flange, said ring being bolted to said first flange and said second flange being rotatable within said ring.

JACOB MADISON.